(12) United States Patent
Black et al.

(10) Patent No.: US 10,755,464 B2
(45) Date of Patent: Aug. 25, 2020

(54) CO-REGISTRATION—SIMULTANEOUS ALIGNMENT AND MODELING OF ARTICULATED 3D SHAPES

(71) Applicant: Max-Planck•Gesellschaft zur Förderung der Wissenschaften e.V, Munich (DE)

(72) Inventors: Michael Black, Tuebingen (DE); David L. Hirshberg, Tacoma, WA (US); Matthew Loper, Tuebingen (DE); Eric Rachlin, Tuebingen (DE); Alex Weiss, Shirley, MA (US)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 0 days.

(21) Appl. No.: 15/932,370

(22) Filed: Feb. 16, 2018

(65) Prior Publication Data

US 2018/0247444 A1    Aug. 30, 2018

Related U.S. Application Data

(63) Continuation of application No. 14/433,178, filed as application No. PCT/EP2012/075525 on Dec. 14, 2012, now Pat. No. 9,898,848.

(Continued)

(30) Foreign Application Priority Data

Oct. 5, 2012   (EP) .................................... 12187467

(51) Int. Cl.
*G06T 13/40*    (2011.01)
*G06T 17/00*    (2006.01)
(Continued)

(52) U.S. Cl.
CPC ................ *G06T 13/40* (2013.01); *G06T 7/50* (2017.01); *G06T 7/97* (2017.01); *G06T 17/00* (2013.01);
(Continued)

(58) Field of Classification Search
CPC ......... G06T 17/00; G06T 19/20; G06T 17/20; G06T 13/40; G06T 7/50; G06T 7/97; G06T 2213/04; G06T 2213/12
See application file for complete search history.

(56) References Cited

U.S. PATENT DOCUMENTS 8,209,144 B1     6/2012 Anguelov
9,070,207 B2 *   6/2015 Yomdin .................. G06T 13/00
(Continued)

OTHER PUBLICATIONS

Allen; The space of human body shapes: reconstruction and parameterization from range scans; Proceeding SIGGRAPH , '03 ACM SIGGRAPH 2003 Papers; pp. 587-594.
(Continued)

*Primary Examiner* — Michael Le
(74) *Attorney, Agent, or Firm* — Knobbe, Martens, Olson & Bear, LLP

(57) ABSTRACT

Present application refers to a method, a model generation unit and a computer program (product) for generating trained models (M) of moving persons, based on physically measured person scan data (S). The approach is based on a common template (T) for the respective person and on the measured person scan data (S) in different shapes and different poses. Scan data are measured with a 3D laser scanner. A generic personal model is used for co-registering a set of person scan data (S) aligning the template (T) to the set of person scans (S) while simultaneously training the generic personal model to become a trained person model (M) by constraining the generic person model to be scan- (Continued)

specific, person-specific and pose-specific and providing the trained model (M), based on the co-registering of the measured object scan data (S).

18 Claims, 7 Drawing Sheets

Related U.S. Application Data

(60) Provisional application No. 61/710,078, filed on Oct. 5, 2012.

(51) Int. Cl.
    *G06T 7/00*     (2017.01)
    *G06T 19/20*     (2011.01)
    *G06T 17/20*     (2006.01)
    *G06T 7/50*     (2017.01)

(52) U.S. Cl.
    CPC .............. *G06T 17/20* (2013.01); *G06T 19/20* (2013.01); *G06T 2213/04* (2013.01); *G06T 2213/12* (2013.01)

(56) References Cited

U.S. PATENT DOCUMENTS

| | | | | |
|---|---|---|---|---|
| 2004/0021660 A1* | 2/2004 | Ng-Thow-Hing | ...... | G06T 7/251 345/419 |
| 2005/0062743 A1 | 3/2005 | Marschner | | |
| 2008/0180448 A1* | 7/2008 | Anguelov | ............... | G06T 13/40 345/475 |
| 2010/0013832 A1* | 1/2010 | Xiao | .................. | G06K 9/00281 345/420 |
| 2010/0111370 A1* | 5/2010 | Black | ................. | G06K 9/00369 382/111 |
| 2010/0259546 A1* | 10/2010 | Yomdin | .................... | G06T 7/12 345/473 |

OTHER PUBLICATIONS

Anguelov; SCAPE: Shape Completion and Animation of People; Proceeding SIGGRAPH '05 ACM SIGGRAPH 2005 Papers; pp. 408-416.

Gilles et al; Creating and Animating Subject-Specific Anatomical Models; Computer Graphics Forum; Nov. 10, 2010; pp. 2340-2351.

Hasler et al; A Statistical Model of Human Pose and Body Shape; Computer Graphics Forum; Mar. 27, 2009; vol. 28 (2009), No. 2; pp. 337-346.

Hirshberg et al. (2012). Coregistration: Simultaneous alignment and modeling of articulated 30 shape. In European Conference on Computer Vision (pp. 242-255). Springer Berlin Heidelberg.

International Preliminary Report on Patentability from PCT/EP2012/075525 dated Apr. 7, 2015.

International Search Report from PCT/EP2012/075525 dated Jul. 22, 2013.

Nano et al. (2009). Efficient reconstruction of nonrigid shape and motion from real-time 30 scanner data. ACM Transactions on Graphics (TOG), 28(2), 15:1-15.

\* cited by examiner

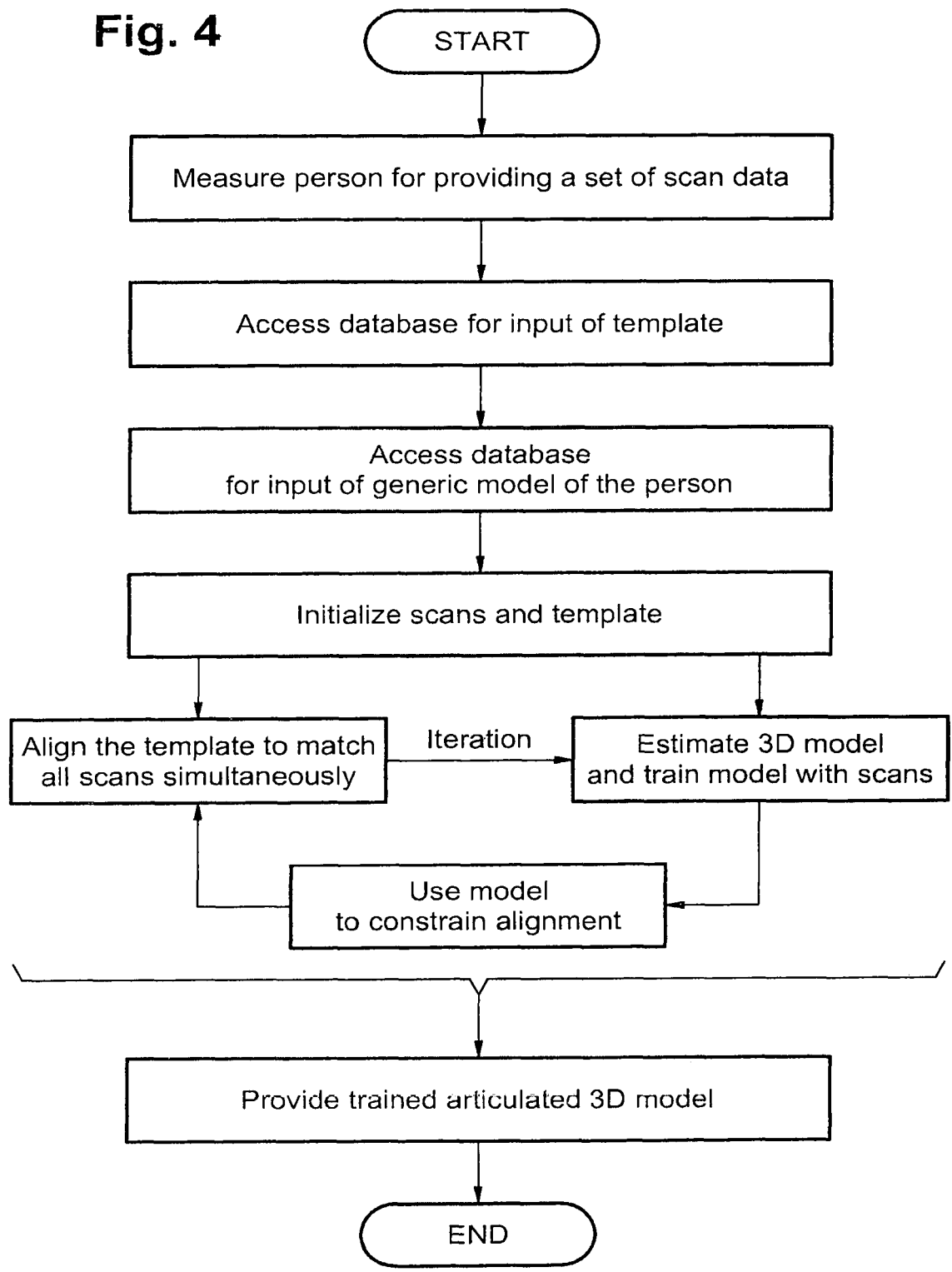

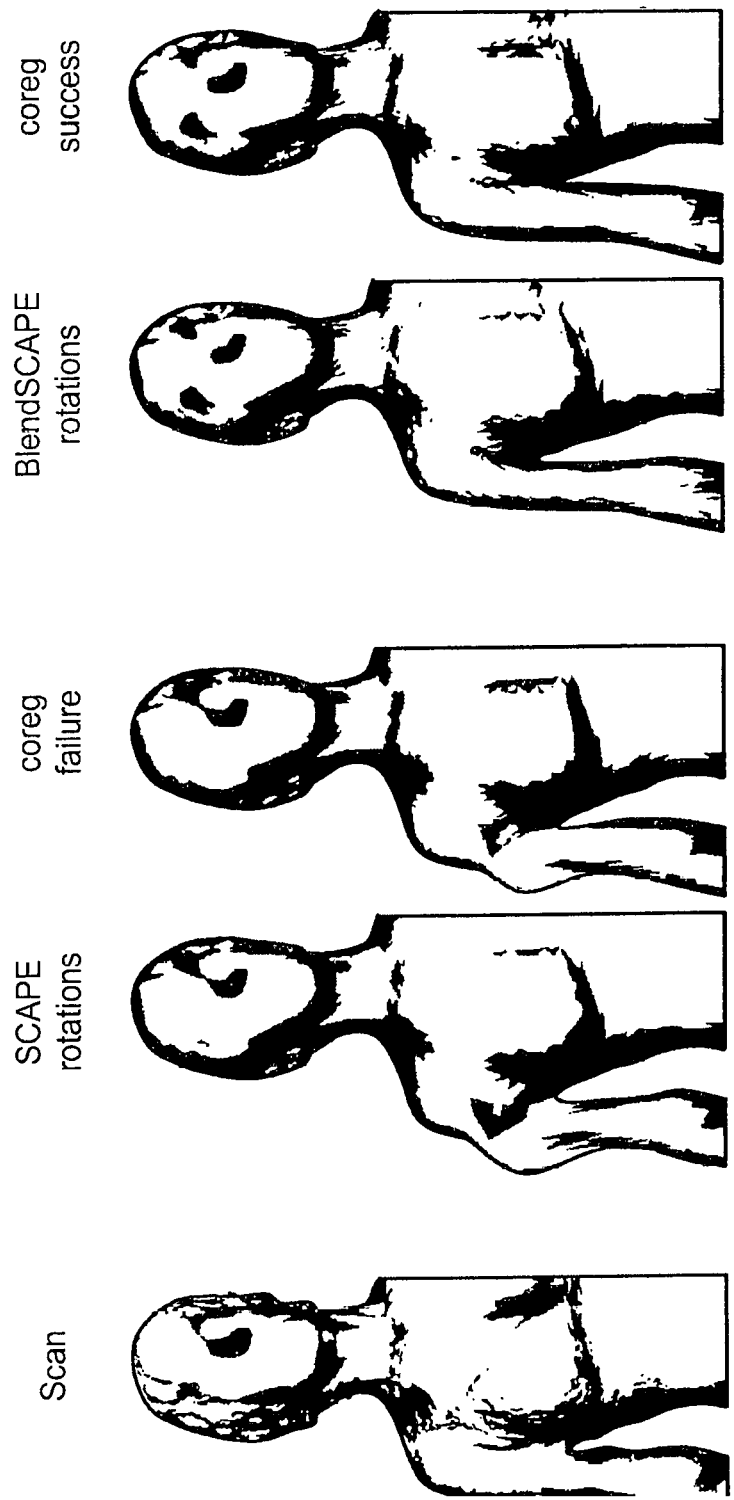

Fig. 7
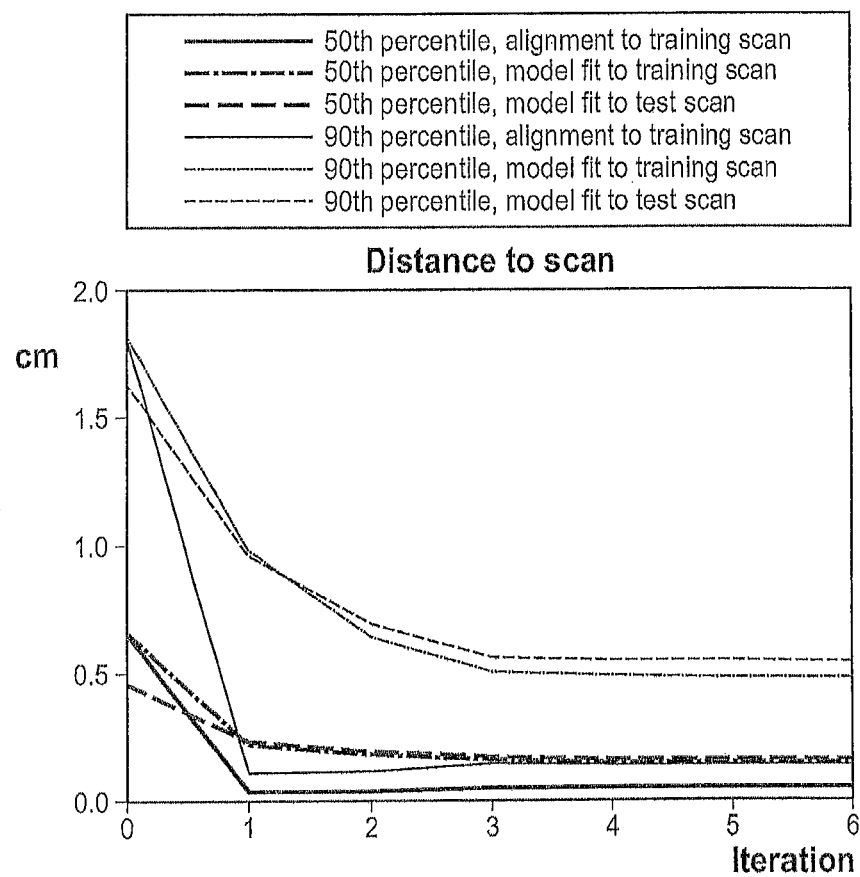
Fig. 7a
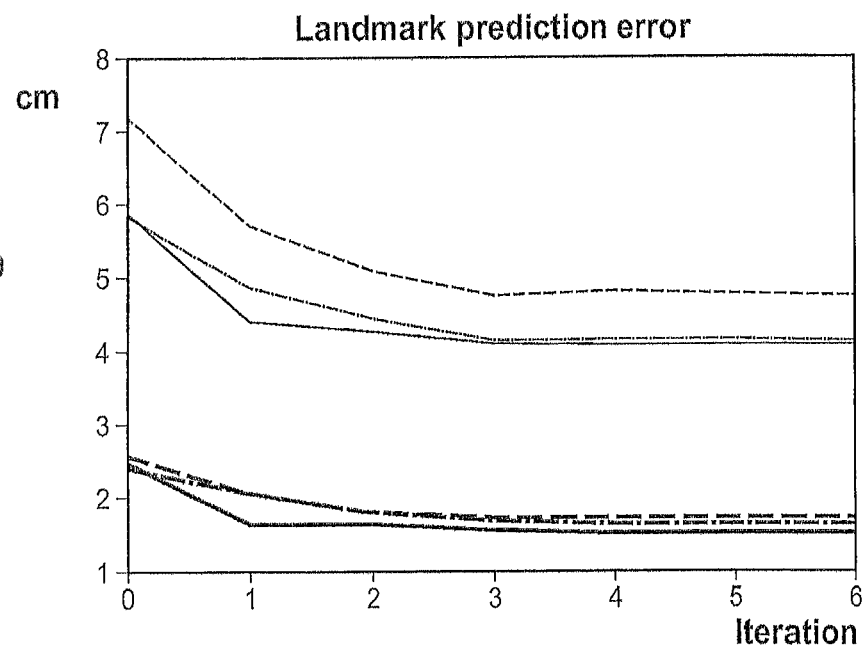
Fig. 7b

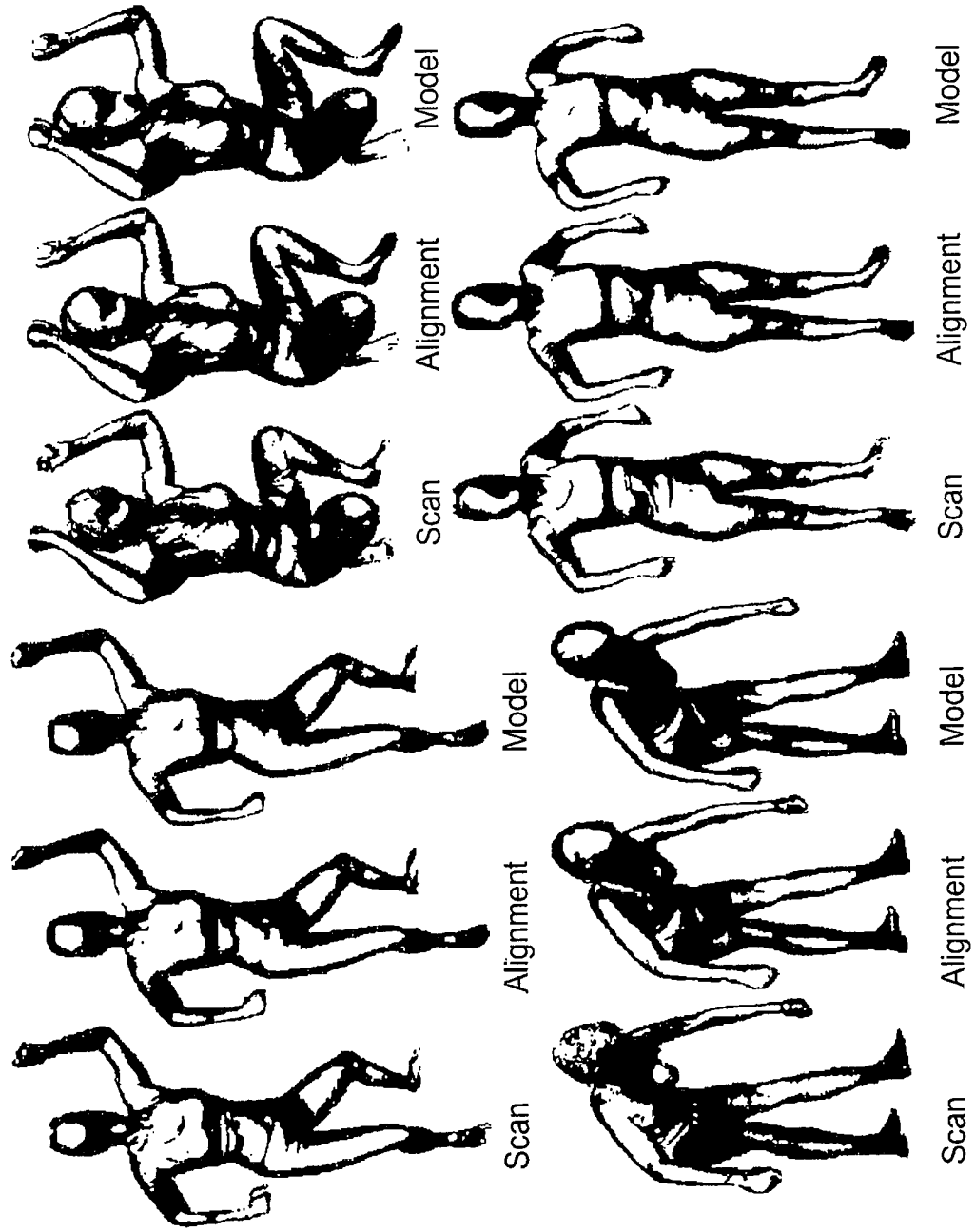

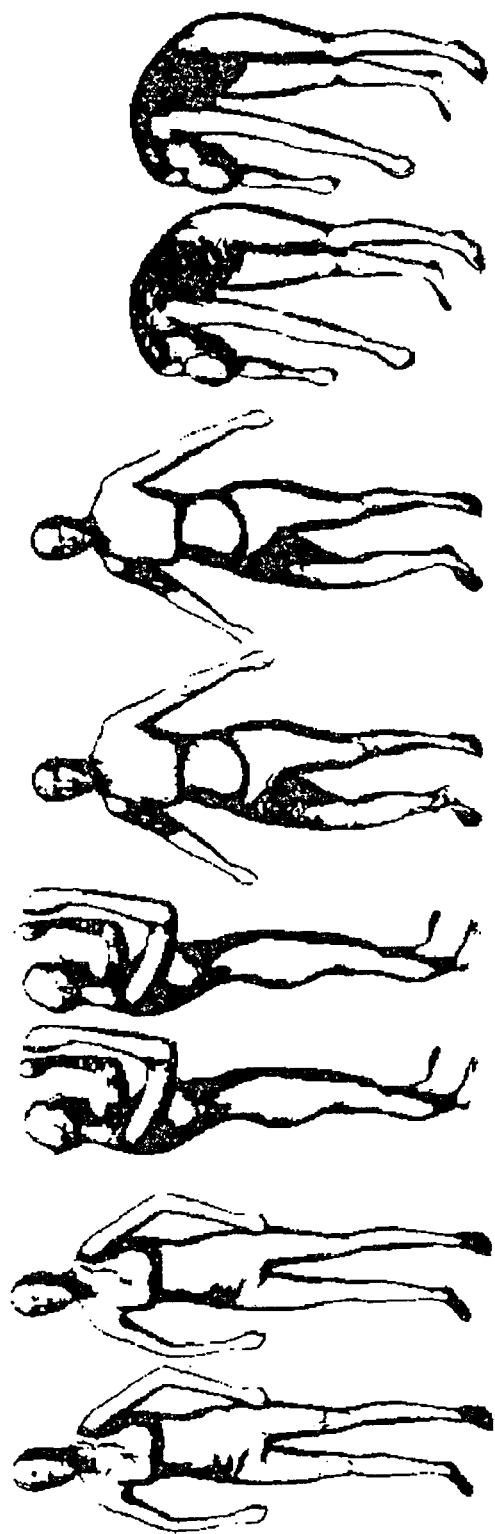

CO-REGISTRATION—SIMULTANEOUS ALIGNMENT AND MODELING OF ARTICULATED 3D SHAPES

INCORPORATION BY REFERENCE TO ANY PRIORITY APPLICATIONS

This application is a continuation of U.S. patent application Ser. No. 14/433,178, filed Apr. 2, 2015. U.S. patent application Ser. No. 14/433,178 is a continuation of International Application No. PCT/EP2012/075525 filed on Dec. 14, 2012, which claims priority to U.S. Provisional Application No. 61/710,078, filed on Oct. 5, 2012. Any and all applications for which a foreign or domestic priority claim is identified in the Application Data Sheet as filed with the present application are hereby incorporated by reference under 37 CFR 1.57.

BACKGROUND OF THE INVENTION

Field of the Invention

Present invention generally relates to a method and system for generating and improving object models, and in particular for generating object models based on measured three dimensional scan data of a person.

Many computer applications provide a graphical user interface for input and output actions which provide a graphical representation of a human body. In this regard virtual object models of human bodies have to be created, which provide for a human body representation in a computer-generated, virtual space, which may be visualized on a computer monitor for different purposes, like for example robotic applications, medical applications and game applications and many others. The models of such "virtual humans" are commonly referred to as "avatars".

Some applications need to align or match the general representations to real physically measured 3D scans, which may be acquired by laser scanners in order to generate a model for the object or person respectively.

Building a model of the body typically has three stages:
1) initialization,
2) registration and
3) model building.

Registering a corpus of (human) body scans involves bringing them into alignment with a common human-shaped template.

To provide plausible alignments of ambiguous meshes, existing alignment algorithms tend to employ simple priors motivated by analogy to deformations of physical objects—the template should deform elastically like rubber, or smoothly like taffy. When registering scans with a common template mesh, such priors yield geometric regularization terms that prevent the template from undergoing wildly implausible deformations. Unfortunately, it is difficult to get adequate constraints from these priors while retaining the flexibility to fit a wide range of poses and shapes.

Strong 3D shape priors enable robust and accurate inference. Building strong shape priors from data, however, is difficult, even with dense accurate measurements from high-end 3D scanners. Methods for learning shape models depend on identifying corresponding points across many 3D scans; that is, registered data. Establishing such correspondences is particularly difficult for articulated shapes such as people with highly varied shapes and poses. Across such scans one can usually identify some key anatomical landmarks (e.g. the tip of the nose, the corners of the eyes) but there are large regions of the body where it is difficult to find useful correspondences, automatically or manually.

State of the Art

The known 3 stage-procedure described above of state of the art registration processes is schematically depicted in FIG. 1. Registration and model building are separate algorithms or processes. The input for the registration process are the 3D scans and the template, which is to be aligned to each of the scans separately and without taking into account other alignments for the respective object.

FIG. 2 shows a corpus registration and learning procedure according to state of the art systems. The template is typically aligned (i.e. deformed) to each scan in isolation (FIG. 2). As can be seen in FIG. 2 a person-shaped template mesh T is aligned to several laser scans $S_1$, $S_2$ of a single person in multiple poses. The alignments $T_1$ and $T_2$ should accurately reflect the shape of each scan and be in good point-to-point correspondence. From the registered training data a model M is learned that accurately expresses new poses. The traditional data likelihoods used to guide template-to-scan alignment measure distance between the two surfaces and distance between corresponding localizable landmarks. This leaves the alignment severely under constrained away from landmarks; motion of non-landmarked template vertices along the scan surface is not measured, allowing these vertices to be positioned inconsistently (i.e. slide) across scans. If available, image texture can provide an additional cue, especially when motion between scans is small, but many scanners do not provide texture data, and it may not be useful when registering scans of different people.

Referring to general mesh registration methods, many of these methods focus on registering (i.e. aligning) only two meshes. Furthermore, most methods for registering many human bodies focus on aligning a template to bodies of different shapes in a canonical pose (see for example: Allen, B., Curless, B., Popović, Z: *The space of human body shapes: Reconstruction and parameterization from range scans*. ACM ToG. (2003) 587-594; Hirshberg, D. A., Loper, M., Rachlin, E., Tsoli, A., Weiss, A., Corner, B., Black, M. J.: *Evaluating the automated alignment of 3D human body scans*. 2nd Int. Cont. 3D Body Scanning Technologies, (2011) 76-86 and Xi, P., Lee, W. S., Shu, C.: A data-driven approach to human-body cloning using a segmented body database. Proc. 15th Pacific Cont. Comp. Graph. and Apps. (2007) 139-147). This has the disadvantage that these methods are inflexible with respect to different bodies (shapes) and different poses of persons.

The first phase, namely initialization, is often done using manually placed markers on the scans and the template mesh (see: Hasler, N., Stoll, C., Sunkel, M., Rosenhahn, B., Seidel, H.-P.: *A statistical model of human pose and body shape*. Comp. Graphics Forum. 28:2 (2009) 337-346 and Allen, B., Curless, B., Popović, Z: *The space of human body shapes: Reconstruction and parameterization from range scans*. ACM ToG. (2003) 587-594). But there have been several automated methods proposed (see: Wuhrer, S., Shu, C., Xi, P.: *Landmark-free posture invariant human shape correspondence*. The Visual Computer 27 (2011) 843-852 and Hirshberg, D. A., Loper, M., Rachlin, E., Tsoli, A., Weiss, A., Corner, B., Black, M. J.: *Evaluating the automated alignment of 3D human body scans*. 2nd Int. Cont. 3D Body Scanning Technologies, (2011) 76-86).

The registration stage deforms the template to closely match the scan and must deal with missing data and noise. Previous work relies on fairly generic spatial smoothness constraints. The third stage uses registered scans to learn a body model or perform statistical analysis of body shape.

In known systems registration and model building have been distinct phases, which are executed in a sequential manner.

In known system 3D scans of articulated, highly nonplanar objects like hands and bodies are typically aligned (and thus registered) using nonrigid ICP algorithms (ICP: iterative closest point). See for example: Hasler, N., Stoll, C., Sunkel, M., Rosenhahn, B., Seidel, H.-P.: A statistical model of human pose and body shape. Comp. Graphics Forum. 28:2 (2009) 337-346, Allen, B., Curless, B., Popović, Z: *The space of human body shapes: Reconstruction and parameterization from range scans*. ACM ToG. (2003) 587-594 and Li, H., Adams, B., Guibas, L. J., Pauly, M.: *Robust single-view geometry and motion reconstruction*. ACM SIGGRAPH Asia. 28 (2009) 175:1-175:10. Moreover, it is also known to use soft or sliding correspondences (Granger, S., Pennec, X.: *Multi-scale em-icp: A fast and robust approach for surface registration*. ECCV, LNCS 2353 Springer (2002) 418-432 and Li, H., Sumner, R. W., Pauly, M.: *Global correspondence optimization for non-rigid registration of depth scans*. Comp. Graphics Forum. 27:5 (2008) 1421-1430). Faces, more often than not, are aligned using nonrigid ICP as well (see: Amberg, B.: *Editing Faces in Videos*. PhD thesis, University of Basel (2011) and Breidt, M., Bülthoff, H. H., Curio, C.: *Face models from noisy 3D cameras*. ACM SIGGRAPH Asia Sketches. (2010) 12:1-12:2). However, there is history of face registration in 2D parameterizations using optical flow (Blanz, V., Vetter, T.: *A morphable model for the synthesis of 3D faces*. ACM ToG SIGGRAPH (1999) 187-194). When a template is deformed to fit scan data, good point-to-point registration is typically maintained using simple, physically-motivated regularization terms on the deformation of the template.

The common regularization terms used during mesh registration fall into two classes. Both act on an estimate of the deformation of space mapping the template surface onto or near the scan surface. Both act on the deformations of the template surface. These are 'smoothness' terms, which penalize deformations changing rapidly over the surface of the template, and 'as rigid as possible' terms, which penalize local estimates of the deformation as they deviate from rigidity. As rigid as possible regularization is used for near-isometric deformations, such as those that occur when aligning scans of the same person (Li, H., Adams, B., Guibas, L. J., Pauly, M.: *Robust single-view geometry and motion reconstruction*. ACM SIGGRAPH Asia. 28 (2009) 175:1-175:10 and Li, H., Sumner, R. W., Pauly, M.: *Global correspondence optimization for non-rigid registration of depth scans*. Comp. Graphics Forum. 27:5 (2008) 1421-1430), and for interactively manipulating a mesh (Sorkine, O., Alexa, M.: *As-rigid-as-possible surface modeling*. Proc. 5th Euro. Symp. Geom. Proc. 26 (2007) 109-116 and Sumner, R. W., Schmid, J., Pauly, M.: *Embedded deformation for shape manipulation*. ACM ToG. 26:3 (2007) 80:1-80:7) while maintaining its perceived character. Maintaining rigidity is less desirable when aligning different body shapes, so corpus registrations (see Hasler et al. and Allen et al., mentioned above and Paysan, P., Knothe, R., Amberg, B., Romdhani, S., Vetter, T.: *A 3D face model for pose and illumination invariant face recognition*. Proc. 6th IEEE Int. Cont. Adv. *Video Signal Based Surveillance* (AVSS) (2009) 296-301) usually rely only on smoothness regularization. Smoothness provides only a second order constraint on mesh registration; adjacent triangles must deform similarly. Smooth template deformations can still result in inconsistent registration across scans. Neither 'smoothness' nor 'as rigid as possible' regularizations are as informative as having an accurate class-specific shape model.

Anguelov et. al. (Anguelov, D., Srinivasan, P., Koller, D., Thrun, S., Rodgers, J., Davis, J.: SCAPE: *Shape completion and animation of people*. ACM ToG. 24 (2005) 408-416) automatically detect initial correspondences between 70 scans of one person in different poses and then perform registration using standard regularization. This state of the art approach, however, does not register multiple people in different poses.

However Wuhrer et. al. (Wuhrer, S., Shu, C., Xi, P.: *Landmark-free posture invariant human shape correspondence*. The Visual Computer 27 (2011) 843-852) discloses to register multiple people in different poses. This method uses automatically-detected landmarks to estimate a rough body pose and then use this to deform a linear-blend-skinned template. This approach provides a reasonable starting point for traditional, regularized, pairwise mesh registration. A major drawback of this approach, however, is to be seen in that it does not address model refinement and learning (based on scan data) respectively.

The above known registration methods employ a static template for regularization. However, Amberg (Amberg, B.: *Editing Faces in Videos*. PhD thesis, University of Basel (2011)) incorporates a deformable model into his method for registering a head template to face scans. The model is coupled to the aligned template by a prior that measures smoothness of the deformation between the registration and an optimized fit of the deformed model.

Once a series of 3D scans have been registered to a common template, standard multivariate statistical methods can be used to model the distribution of shapes. In the case of faces (see Amberg et al., Breidt et al. and Blanz et al.) and bodies scanned in a single pose (see Allen et al.), low-dimensional models have been obtained by performing principal component analysis (PCA) on the aligned vertices.

For scans of multiple poses, articulated body models have been proposed that represent both the shape and pose of each registered scan (Hasler et al., Anguelov et al. and Allen et al.).

When a model is learned from registered scan data, the quality of that model is heavily dependent on the quality of registration. In some cases, registrations have been improved by using them to learn a model, then using the model to initialize a second round of registration. Blanz and Vetter (mentioned above) use such iteration to improve correspondence in their optical flow-based registration method. However, this document does not disclose a fusion or combination of registration and model building procedure.

Therefore, a need exists to provide a model learning, which successfully considers real physically measured 3D scan data.

Object

Accordingly, there is a need for improved systems, products and methods for model building, which take into account physically measured 3D scan data for model improvement and model training. The model building should thus be improved and constrained by shapes learned with good data measurements. Moreover, the model building should be more accurate, highly realistic for different persons, in different poses. Finally, it should be possible to update the generated model to (best) fit the measured data.

SUMMARY OF THE INVENTION

In the following, the invention will be described with respect to the method, which corresponds to a software implementation which is to be executed in a computer or computer network environments. However, the invention also might be implemented in hardware or in hardware modules, possibly combined with software modules. The hardware modules are then adapted to perform the functionality of the steps of the method, described above. Accordingly, the steps, claimed or described with respect to the method may also be transferred to and implemented as hardware modules, adapted to provide the respective functionality. For example the method step "providing physically measured data" may accordingly be implemented by a "3D laser scanner" or a data acquisition device or by a unit which reads in the acquired data from the device/scanner, and vice versa. It is also possible to have a combination of hardware and software modules. At least some of the modules are preferably integrated into a computer or into a graphics card of a computer.

According to an aspect present invention is directed to a method for generating trained articulated models of moving objects, based on physically measured object scan data, comprising the following steps:

Providing at least one common template for the respective object or person Providing physically measured object scan data from objects in different shapes and different poses Providing a generic object model Providing initialized object scan data with respect to the provided template (and thus providing initialized scans and template data)

Co-Registering a set of initialized object scan data by executing the steps of registering and model generation in a combined manner, namely:

Aligning the initialized template to the set of initialized object scans (this is preferably done iteratively) while simultaneously training the generic object model to derive a trained articulated object model by constraining the generic object model to be scan-specific, object-specific and pose-specific Providing a set of alignments and/or a set of trained models both being optimized to be maximally consistent with the object scan data.

In the following the terms used within this application are explained in more detail.

The term "model" refers to a set of object instances, wherein each instance is a graphical representation of the moving object, particularly of the person. The model is constrained by anatomically possible movements (limb rotations, extremity positions etc.). Initially, the process begins with a generic-looking articulated model of the subjects or objects being aligned. This model is used to guide the alignment algorithm, and then the resulting model-guided alignments are used to update, or refine, the articulated model of each object. Thus, an initial ("generic") model is trained by iteratively applying co-registration procedure steps according to this invention to derive and provide a learned ("trained") model, which may be posed according to a set of pose parameters. The 3D mesh model, then, accurately reflects and represents the shape of the person in the specified pose.

An articulated model is a model (preferably a 3D model) that has been divided into body parts (anatomical regions, like for example legs, arms, hands, head etc.), where each body part is allowed to rotate independently of the other parts. The articulated 3D shape of a person is used to refer to the 3D shape of a person when they are positioned in a particular pose, which has been measured or captured with the laser scanner in a specific, fixed 3D position (including different positions, shapes, poses or representing a gesture, like raising arms etc.). By learning a model, an articulated (i.e. posable) model of each person is calculated or estimated. According to this invention, the model is used to constrain the alignment process. An articulated model captures shape and pose of the person (object) in each scan.

The terms "model" or "articulated model" typically refer to a posable 3D model of a person. When such a model is placed in a particular pose, the result is a static 3D mesh that captures the 3D shape of a particular person situated in a particular pose. In this way, an articulated model can be thought of as a tool for converting "pose parameters" or specific poses into other poses or other 3D locations in space (e.g. joint-rotation angles) (i.e. the 3D location of each point on a person's body when they are positioned in a given pose). An articulated model, thus, refers to a model in which all body parts (limbs, extremities, head, upper/lower part of the body etc.) may be moved or posed independent of the other parts. According to an aspect of present invention only one model is used and processed which is refined in each step of iteration (iteration over new scans).

The term "object" relates to a three-dimensional object that varies in shape either used to deformation or articulation or both. Preferably, the object is a person in different poses and who may have different shapes. Alternatively, the object may also refer to an animal or other natural or artificial objects, have varying surfaces. The object is a three dimensional body. The 3D relations and dimensions are captured by a device or are already provided and may be read in by means of an input interface. The scan data thus relates to a set of 3D scans, preferably recorded with a laser scanner or a high resolution structured light scanner or with another 3D sensing device. In the following the term scan data and template (data) are to be construed as scan data and template data, being initialized.

A "template" is a generic representation of a specific object or person in a specific pose. Typically, the template is mesh template. Each alignment to each scan can be thought of as a scan-adapted template (i.e. the template mesh has been deformed to best-fit that scan). In addition to each scan-adapted template, the algorithm provides a person-specific articulated 3D model. The model can then be posed to fit each alignment. This posed model, when posed to match a specific scan, results in a static 3D mesh that can be thought of as a person-specific and pose-specific deformation of the original template.

"Physically measured" means acquiring scan data by means of a physical and/or electronic scanning device, which may particularly be a 3D sensing device with light and a camera, e.g. a laser scanner or a device using structured light (i.e. a structured-light 3D scanner, measuring the three-dimensional shape of the object using projected light patterns and a camera), a system or a device, measuring the time-of-flight of a light signal between the camera and the object (ToF camera) for each point of the image, a millimeter wave camera, sensing millimeter-wave radiation of the respective object etc. A preferred 3D sensing device used within an embodiment of present invention refers to a 30 gesture recognition and object sensing system, like a Kinect System, which is used by Microsoft, Redmond, USA for a video console and which has been developed by Primesense, Israel.

The approach presented in this application is an alternative to the usually known three-step process (initialization, registration, model building): present invention combines these last two stages. According to present invention the training and learning of the generated model is integrated with the registration process. Thus, there is a two-step process that regularizes alignments using an articulated 3D model of human shape and pose. Unlike previous work that uses a simple articulated model for initialization a richer, learned, model of body shape for accurate registration is used in this invention, which, generally, shows improved results in both better models and better alignments.

One key aspect is to simultaneously learn an articulated model and fit it to scan data. This combined or interleaved approach has two major advantages: $1^{st}$: Having a good model makes registration easier, and $2^{nd}$: Having good registration makes building a good model possible.

This concurrent approach to scan alignment and model building, is termed co-registration, and offers a significant advantage over the traditional two-stage approach in which one first aligns each training example with the template mesh, and then builds a shape model from the aligned data. It provides a well-defined objective function for registering a corpus of scans. As explained below, a good set of alignments must tightly fit the surface of each scan, while simultaneously remaining consistent with an underlying articulated shape model. A surface fitting term ensures that each alignment accurately captures the shape of each scan, while a model term ensures that template registration remain consistent across scans. The value of simultaneously aligning a corpus comes from:
1) the ability to leverage good data to explain poor or missing data;
2) the consistency of each individual's shape across poses;
3) similarities in the deformations of different bodies as they change pose;
4) the presence of ambiguities in pairwise alignment that can be resolved by modeling a class of objects.

For example if one considers an area like the armpit or crotch where data is often missing in laser scans. If the person is seen in multiple poses, some of these may have complete data in these regions. Co-registration according to this invention allows the shape learned with good data to constrain the alignment, while ignoring missing data. This is in contrast to most traditional methods, which rely on generic regularization in each scan to deal with this missing data. The few methods which describe model-specific regularization do not propose or optimize an objective function which encompasses both the quality of the model and that of the alignments.

To demonstrate the effectiveness of the co-registration approach according to an aspect of present invention, the co-registration procedure is applied to multiple collections of 3D body data in order to obtain accurate alignments and highly-realistic articulated models for all subjects.

According to a preferred embodiment the focus of present invention is on the human body and the simultaneous registration of many meshes with a common template. This corpus registration problem is quite different and admits this solution that integrates registration with model building.

Generally, present invention refers to a rendering task (generating and displaying a person's model as on a screen) in combination with a measurement task (sensing 3D image data), wherein measurement signals are used to determine generation, update and display of the model. The model, thus, can be construed as having "parameters" of some form that are updated to fit the measured data. The parameters, for example, could be weights of different template shapes.

In the following some preferred embodiments will be described. These embodiments and features, mentioned in this context may also be applied for the model generation unit and to the computer program product as well.

Present invention is preferably based on a SCAPE model (see Anguelov et al.). According to other embodiments the method presented here readily generalizes to other models.

Preferably, one template is considered for one object or person. However, alternative more complex embodiment refers to considering several templates for one person/object. This would be roughly equivalent to modifying SCAPE, or BlendSCAPE, such that each model was composed of multiple deformed templates, instead of just a single deformed template. This is most useful when modeling an object that radically changed shape (for example, if an individual had a removable leg). For such a model to make sense, however, it is necessary to first detect and calculate a correspondence between the two templates (i.e. the templates themselves would have to have a known point-to-point correspondence). This might also be used for a person in different types of clothing—each clothing type could be a different template.

In contrast to state of the art systems defined by Blanz and Vetter (mentioned above) present invention is based on defining an objective function that combines model building and registration. This approach brings a corpus of differently shaped bodies in varying pose into registration while learning a model of human pose-dependent shape variation. The result is quantitatively better registrations and a better articulated body shape model.

According to an aspect of present invention initializing is executed by marking automatically or manually the measured scans and the templates in order to generate a unique correlation between scan position and template position. The step of initializing may be executed in a preparation phase which usually is executed before a co-registration phase. However, it is also possible to calculate initializations of the template fit to each scan in the co-registration before actually calculating the co-registration.

According to a further aspect of present invention, all object scans are registered in parallel while simultaneously calculating object shape deformations and a pose-dependent deformation model across all scans. This has the advantage that it is possible to train the generated model according to different object shapes and poses.

According to a further aspect of present invention, aligning is executed by deforming the template to all scans of the set of scans in parallel and/or by inferring object shape from incomplete, noisy and/or ambiguous 2D or 3D data. This makes the algorithm more robust against failures in data acquisition.

According to a further aspect of present invention, co-registration uses data present in another scan in order to propagate information learned from the other scan to present scan.

According to a further aspect of present invention, at least some or all of the steps are executed iteratively so that the generic model may be replaced in the course of process with the trained model.

With respect to symmetry constraints it is to be mentioned that according to an aspect of present invention no symmetry constraints are used. Each half of a person body can, theoretically, deform independently. Once co-registration is complete, however, the resulting model may include an additional calculation step by providing an implicit comparison between the right and left sides of a person's body. Similarly, the resulting alignments do capture the relative locations of corresponding points on the right and left sides of a person's body.

A further aspect of the invention refers to a model generation unit according to the accompanying claims. In this respect it has to be mentioned that the model generation unit may also be adapted with features mentioned with respect to the method above in order to be within the scope of present invention. The model generation unit may be implemented as an electronic unit, comprising a processor which is adapted to execute the method for model generation.

The model generation unit comprises a template interface, which is adapted to provide at least one common template for the respective object, a sensing device for measuring object scan data in different shapes and in different poses, which preferably is a 3D sensing device, such as a high resolution structured light scanner. The model generation unit further comprises access means to a storage for storing at least one generic object model, and an initializing interface, which is adapted to provide initialized object scan data with respect to the template or to initialize these data (on the fly). Moreover, the model generation unit comprises a co-registration unit, which is adapted for co-registering a set of initialized object scan data by executing registering and model generation not sequentially (as in state of the art systems), but in a combined manner, namely:

- To interact with an aligning entity for aligning the initialized template to the set of initialized object scans while simultaneously training the generic object model to derive a trained articulated object model by constraining the generic object model to be scan-specific, object-specific and pose-specific.

Further the model generation unit comprises an output interface for providing at least a set of trained models and/or a set of alignments (optionally), wherein the alignments and the articulated 3D model is maximally consistent with the measured object scan data.

The model generation unit might be implemented as a software package (may be provided as a 3D graphic toolkit) and might be (at least in part) run in a computer's graphic card or on a separate computer, for example on a dedicated infrastructural node in a computer cluster, a cloud or in a computer network. Typically, a system memory is used.

Another embodiment of present invention refers to a computer program being loadable in a memory of a computer, wherein the computer program is adapted to carry out the steps of the method as mentioned above, provided that the computer program is executed in the computer.

Moreover, another aspect relates to a system and a product for model generation by applying the method as described above. The method is computer-implemented and may be executed on different computer instances as a distributed system. For example, the co-registration unit may be executed on another instance as the initializing interface or a respective initializer. The computer program product is tangibly embodied on a computer readable medium and comprises computer instructions, that when executed, are configured to perform the method as described above.

BRIEF DESCRIPTION OF THE DRAWINGS

Embodiments of the present invention will now be described with reference to the accompanying drawings in which:

FIG. 4 is a flowchart of a co-registration procedure according to a preferred embodiment of present invention, FIG. 5 refers to using a SCAPE and BlendSCAPE model according to a preferred embodiment of present invention, FIG. 6 a comparison of a SCAPE versus BlendSCAPE model according to a preferred embodiment of present invention, FIG. 7 shows the convergence of quality indicators, according to a preferred embodiment of present invention FIG. 7a shows a distance from a scan according to a preferred embodiment of present invention FIG. 7b shows a landmark prediction error according to a preferred embodiment of present invention, FIG. 8 shows examples from co-registration according to a preferred embodiment of present invention and FIG. 9 shows registration denoising according to a preferred embodiment of present invention.

DETAILED DESCRIPTION OF THE PREFERRED EMBODIMENT

Figure 1:
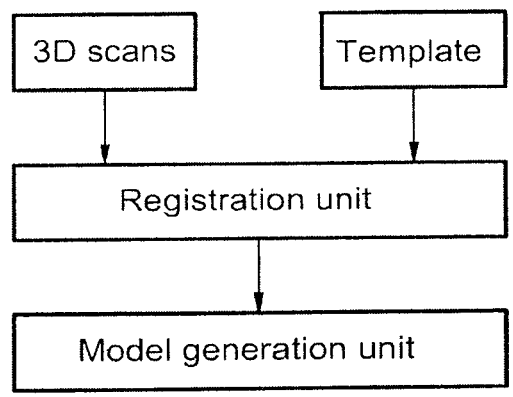
FIG. 1 is a schematic overview of relevant units for building a 3D model of a person in prior art.

The figures illustrate principles of the invention according to specific embodiments. Thus, it is also possible to implement the invention in other embodiments, so that these figures are only to be construed as examples. Moreover, in the figures, like reference numerals designate corresponding modules or items throughout the different drawings.

Figure 3:
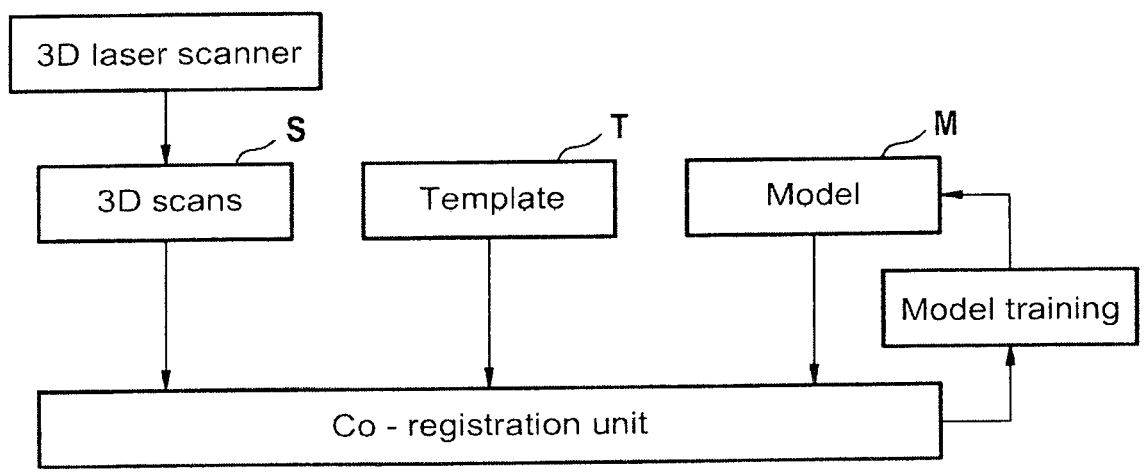
FIG. 3 shows a schematic overview according to the co-registration procedure according to a preferred embodiment of present invention.
Figure 2:
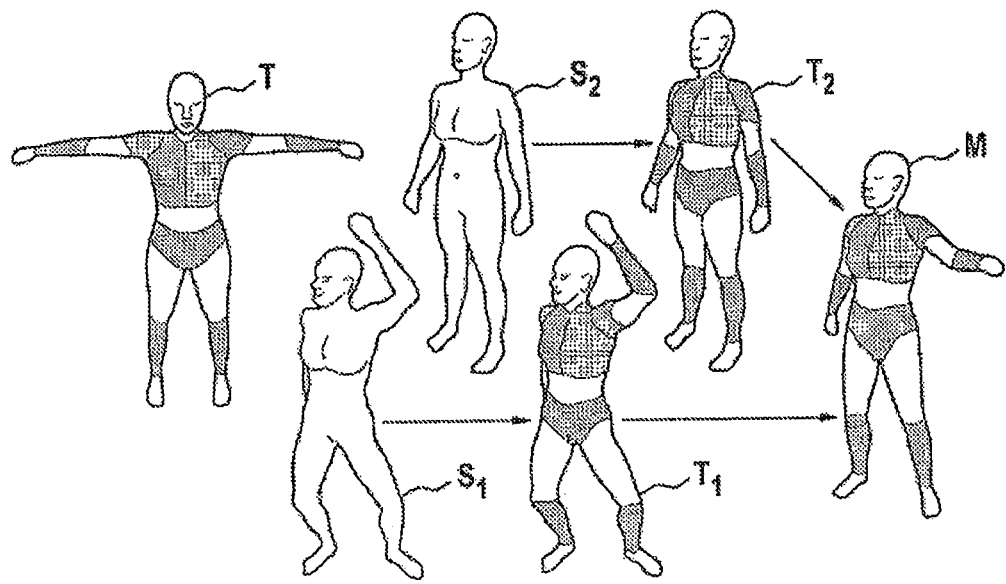
FIG. 2 shows by way of example a corpus registration procedure and respective learning according to prior art systems.

FIG. 3 shows all relevant units and processes for model building according to a preferred embodiment of present invention. A 3D sensing device like a high resolution structured light scanner is used to provide a set of scans of an object, particularly a person, in different poses. Thus, a first scan $S_1$ may refer to the person sitting on a chair, the second scan $S_2$ may refer to the person lying on a couch, the third scan $S_3$ may refer to the person standing and a fourth scan $S_4$ may refer to the person walking. The scans $S_1, S_2, \ldots, S_n$ serve as input parameters for the co-registration procedure.

Further, a 3D template T is used. Particularly, the template T is a generic 3D wire mesh model for a representation of an object and particularly of an individual person. Thus, a set of scans S, a template mesh T and a rough initialization of the template match or fit (i.e. the alignment) to each of the scans S are given and are used for model generation. According to an aspect the articulated generated 3D model is refined step-by-step iteratively according to the different read-in scans S.

A generic 3D model M of each person is used as input for co-registration. Preferably, an articulated 3D model of each person is crudely estimated using the shape and part segmentation of the generic-looking human-shaped 3D template.

As can be seen in FIG. 3 the 3D scans S, the template T and the untrained, generic model M serve as input parameters for the co-registration procedure.

As can be seen by comparing FIG. 1 and FIG. 3, the co-registration procedure differs from known procedures in that the alignment/registration step and the model building step are combined.

As already mentioned in the general description above previous methods for building articulated models (for example Hasler et al.) have relied on a three phase process:
1. data initialization
2. data registration or alignment—i.e. aligning the raw 3D data with a 3D template. Usually the template is deformed in order to match the scan data by bringing the template into point-to-point correspondence with the respective scan.
3. After the registration process is completed and all data are aligned, model building is initiated. All the aligned data is used to build an articulated model that captures the shape and pose of the person in each scan.

In contrast, the co-registration algorithm according to present invention treats 3D alignment (step 2) and model learning (step 3) as a single problem. These two steps are executed in an interleaved or combined manner. Initially, a generic looking articulated model of the person being aligned is used. This model is used to guide and constrain the alignment algorithm and then the resulting model-guided alignments are used to update, or to refine, the articulated model of each person. This process is repeated many times iteratively. When the entire co-registration process is complete, the result is a set of alignments (one alignment per scan) and a set of articulated 3D models (one model per person). Both the alignments and models have been optimized to be maximally consistent with the originally 3D scan data.

A further significant difference between present invention and state of the art systems refers to the fact that in previous systems aligning the template to the scans has been executed independently, i.e. deformation of the template T according to scan $S_1$ has been executed independent of the deformation of the template T according to scan $S_2$ and to the other scans. By contrast, present invention performs the aligning of each scan S of a person dependent on the respective other scan alignment procedures. This approach makes it possible to consider the consistency of each individual's shape across a different poses and the similarities in the deformations of different bodies as they change pose.

As can be seen in FIG. 3 co-registration comprises model training, which is based on real measured 3D scan data of the individual person.

With respect to FIG. 4 a possible flowchart of a co-registration and model building procedure is described below.

After starting the procedure a set of scan data is measured by a 3D laser scanner. Optionally other acquisition methods may be used to provide two-dimensional representations of a 3D dimensional object. Preferably, the object is an individual person in different poses. Generally, it is possible to measure the data or to access measured data by an interface. The measured data may be stored in a database or another storage unit.

The second step refers to reading in a template T. This may also be done by accessing a respective database.

In the third step a generic model of the person is accessed.

It has to be noted that the sequence of the steps mentioned before may be changed.

In the fourth step the scans S and the template T are initialized. Initialization may be done by using manually placed markers on the scans S and on the template mesh. Alternatively it is also possible to use automated methods for initialization. Initialization may be executed in a preparation phase, preceding the model generation phase, in order to provide already initialized scans S and template T.

As can be seen in FIG. 4, the fifth step refers to the co-registration procedure. A co-registration is implemented as an iteration. Co-registration comprises both:
aligning the template to match the set of object scans (this is depicted on the left-hand side in FIG. 4) and
estimating a 3D model and training this model according to the aligned scans. This model is used to constrain the aligning procedure.

The co-registration repeatedly re-estimates both models and alignments. Each time the model is re-estimated, it is constrained to fit all the alignments as accurately as possible. More specifically, each model contains a large number of internal parameters which determine the model's overall body shape, as well as how the model deforms to accurately assume a range of poses. These internal parameters are computed so as to best match the alignments of all scans. These internal parameters provide a series of linear constrains that determine how each triangle of the model should change shape as the model changes pose. The parameters also describe the overall body shape of each person being aligned. If scans of enough people are provided, they can also describe how body shape is likely to vary across an entire population. Further statistical methods procedures may be used here. After a co-registration is completed there is provided a trained articulated 3D model M of a person and also for different persons in different poses.

Usually the method ends after providing the trained articulated 3D model M. Alternatively, it is also possible to execute at least a part of the steps repeatedly, for example for an updated set of 3D scans (for example another person).

One key aspect of the present invention is to be seen that all the scans of a person are computed parallel, so that the template may be aligned to match all scans simultaneously and dependent on the other scans. By combining aligning and model building it is possible to wave manual corrections or hand tuning of the alignment algorithm (which sometimes turns out to be necessary in previous registration and model building methods).

Once more referring to FIG. 4 it can be seen that when co-registration is used to simultaneously align many scans S in parallel, simultaneously an articulated 3D model of each person is estimated. This 3D model is used to guide the alignment process, which is also depicted in FIG. 4.

Preferably, all steps of the method mentioned in this application are computer-implemented and may be implemented in software. Particularly, the alignment is an alignment algorithm and the model building is also implemented by an algorithm. By executing these algorithms (aligning and model building) it is possible to ensure that all of the alignments, as well as the model, are maximally consistent in terms of their anatomical point-to-point correspondence across scans.

By learning or training the model of each person, an articulated (i.e. poseable) model of each person is estimated. This model is used to constrain the alignment process. When the model does not provide hard constraints on the shape of the each alignment, each alignment is penalized by how much it disagrees with the model. With other words, if the model associated with person x cannot be posed to closely match the alignment of person x to a given scan, that alignment will be strongly penalized. This penalty encourages the algorithm to further deform the alignment such that it more closely matches the shape of the model.

The co-registration and model building procedure according to present invention may be based on different model generation methods. It is possible to use the SCAPE model or the BlendSCAPE model, which will be described in detail below.

SCAPE and BlendSCAPE:

SCAPE is a model of human body shape learned from registered scans. In this respect it is referred to Anguelov, D., Srinivasan, P., Koller, D., Thrun, S., Rodgers, J., Davis, J.: SCAPE: Shape completion and animation of people. ACM ToG. 24 (2005) 408-416.

The SCAPE model defines how to deform a human-shaped triangulated template mesh, T*, to take on different poses and identities (body shapes). Let T* be pre-segmented into parts (differently coded in FIG. 5) connected in a kinematic tree structure. The relative rotations between neighboring parts in the tree are represented as Rodrigues vectors. Let θ be a vector collecting all the relative rotations and R(θ) represent the absolute rotations of the triangles in a part. In SCAPE, every triangle within a part has the same rotation. Let D represent the deformations that transform T* into the shape of a specific person. Finally, let Q(θ) define non-rigid deformations of the triangles of T*' that capture shape change as a function of pose θ.

Figure 5:
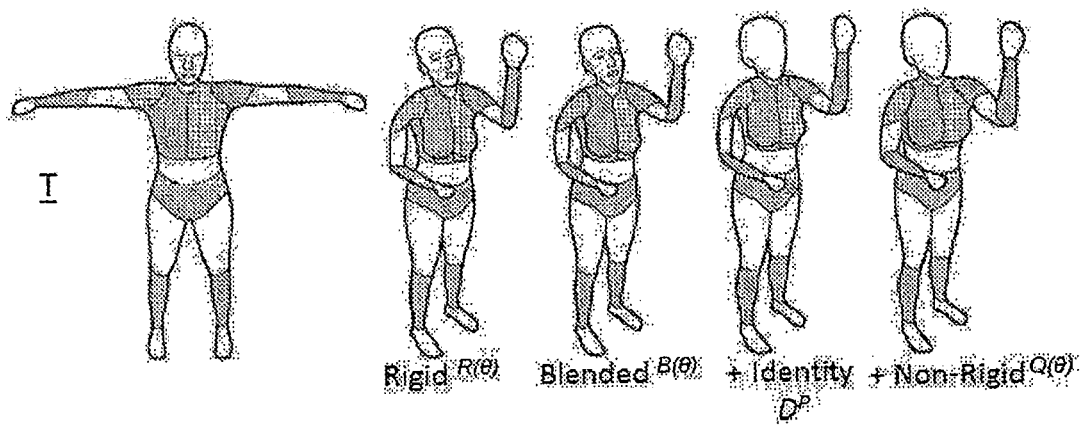

As can be seen in FIG. 5 a template may be deformed with SCAPE and BlendSCAPE. On the left hand side in FIG. 5 the template T is depicted, and on the right hand side there is shown the deformed templates:

Rigid $^{R(\theta)}$
Blended $^{B(\theta)}$
+ Identity $D^P$
+ Non-Rigid $^{Q(\theta)}$.

The template is deformed in three steps. First T* is decomposed, or "unstitched," into disconnected triangles, $T_f^*$. Each unstitched triangle is represented by a pair of its edge vectors, "forgetting" its location but retaining its shape and orientation. Second, each unstitched triangle is individually deformed according to a sequence of pose- and shape-dependent 3×3 linear deformations. Each unstitched triangle $T_f^*$ is "posed" by a rotation $R_f(\theta)$ and deformed to represent a person's body shape using a 3×3 matrix $D_f$. It is also deformed by a 3×3 matrix $Q_f(\theta)$ that accounts for pose-dependent shape changes like muscle bulging and skin wrinkling and corrects for deviations between the rigidly posed model and the true shape. A transformed triangle is written $$T_f = R_f(\theta) D_f Q_f(\theta) T_f^*$$

These deformed triangles are recomposed, or "stitched," to define the vertices of a watertight mesh M(θ,D,Q). Because triangles are transformed independently, and will disagree at shared edges, we solve for the final vertex locations of the mesh using least-squares.

SCAPE uses a partition of the template triangles into rigid parts to define its model for R. Since each part is independently rotated, the final stitched body surface can collapse, crease or fold near joints (see FIG. 5). Q can be trained to correct these artifacts given artifact-free alignments, but if these artifacts are sufficiently severe they can cause convergence problems during co-registration.

To address this a BlendSCAPE model is introduced, in which each triangle's rotation is a linear blend, $$B_f(\theta) = \sum_i w_{fi} R^i$$

of the rotations, $R^i$, of the parts, indexed by i, in the kinematic tree. These weights, $w_{fi}$ can be estimated along with the other parameters of the model, but in this work we define them manually by smoothing our SCAPE segmentation across part boundaries. The template posed with BlendSCAPE is shown in FIG. 5. Clearly $B_f(\theta)$ itself does not provide a realistic model of body pose deformation, but rather reduces the work that Q must do to correct its errors. It has been found that this improves model fitting to scans and, consequently, registration (FIG. 6).

FIG. 6 shows a comparison of SCAPE vs BlendSCAPE. Rigid part rotations, R, can introduce significant artifacts early in the fitting process, particularly when scan noise (e.g. holes) coincides with part boundaries of the model. Co-registration has difficulty in eliminating these artifacts. In contrast, B from the BlendSCAPE model introduces smoother, less significant artifacts, which co-registration rapidly corrects.

A corpus of body scans is assumed, containing multiple people, each in multiple poses, and it is known which scans correspond to which people. After co-registration, each scan is modeled by a person-specific $D^P$ that represents that individual's body shape, a scan specific pose, $\theta^s$, and a pose-dependent $Q(\theta^s)$ for each scan in which the function Q is the same all across people. As in previous work (see Anguelov et al.), the deformation Q is a linear function of the Rodrigues vectors describing the relative orientations of adjacent parts:

$$Q(\theta) = Q^0 + \sum_c \theta_c Q^c$$

where $\theta_c$ is the $c^{th}$ element of the pose vector θ, and $Q^0$, $Q^c$ contain the linear coefficients and are learned from the corpus of registered bodies. This model is constrained so only the orientations of parts near a triangle contribute to its deformation (i.e. $Q^c$ is kept sparse).

Previous SCAPE models have been built using two body scan corpora: one containing people of different shapes in roughly a fixed pose and the other containing one person in many poses. This is in contrast to Hasler et. al. who train a model with correlation between shape and pose using scans of several people in different poses. Present invention describes the first SCAPE pose model, Q, trained from multiple people in multiple poses.

This improves the ability to model the deformations of different people. In summary, a scan in the corpus is approximated with a model $M(\theta^s, D^P, Q)$ that poses the model using $B(\theta^s)$, deforms it to the identity of the person using $D^P$, and accounts for nonrigid shape changes using Q, which are a function of pose, $\theta^s$.

Co-Registration:

The process of co-registration is explained in more detail below.

Co-registration aligns a triangulated template mesh to a corpus of 3D scans while simultaneously training a BlendSCAPE model. Below a data penalty term is defined that seeks to deform the template T to match a scan S and a novel coupling term that constrains this deformation to be similar to a learned BlendSCAPE model. Optimization involves solving for both the alignment and the model parameters.

To train the model M, a pose $\theta^s$ for each scan in the corpus must be estimated, a shape $D^P$ for each person in our corpus, and a single linear pose-dependent deformation model (θ). Once co-registration is complete, each scan should be tightly fit by a deformed template mesh and should also closely match the corresponding BlendSCAPE body $M(\theta^s D^P, Q)$. Note that before training an "untrained" BlendSCAPE model exists in which D and Q are the identity. At the start of co-registration, the template is roughly aligned by posing and scaling the untrained BlendSCAPE model. For this step a set of landmarks associated with each scan is used. Note, however, during co-registration the landmarks are discarded, in contrast to state of the art systems (Allen et al.).

Given a scan S, the following data term, $E_s$, is defined, evaluating the fit of the deformed template T to the surface of the scan S:

$$E_S(T;S) = \frac{1}{a_S} \int_{x_s \in S} \rho(\min_{x_t \in T} \|x_s - x_t\|), \quad \text{(Equation 2)}$$

Where $\rho$ is the German-McClure robust error function $$\rho(x) = \frac{x^2}{\sigma^2 + x^2},$$

S is the scan surface, $a_s$ is the scan's surface area, and T is the surface of the aligned template. The data error is approximated, using a fixed set of locations $x_s$, uniformly sampled over the surface of the scan S. It is also possible to add a landmark term into $E_s$ that would constrain known locations on the template to be close to measured locations on the scan.

To address the correspondence ambiguity inherent to $E_s$, a coupling term is added, penalizing differences between the aligned template and the current model:

$$E_C(T, \theta, D, Q) = \sum_f a_f \|T_f - B_f(\theta) D_f Q_f(\theta) T_f^*\|_F^2, \quad \text{(Equation 3)}$$

where $T_f$ represents the pair of edge vectors of the unstitched triangle f of T, $B_f(\theta) D_f Q_f(\theta) T_f^*$; is the corresponding unstitched triangle of $M(\theta, D, Q)$, and $a_f$ is the area of f on the template mesh, $T^*$. The squared Frobenius norm is used to measure the difference between corresponding unstitched triangles of T and $M(\theta, D, Q)$. This is simply the sum of squared distances between corresponding pairs of edge vectors.

Additionally, simple regularization terms are used to constrain the body shape deformations, D, and the pose-dependent deformation model, Q. The first term promotes spatial smoothness of the deformations, D, that map the template mesh to an observed person. The second term penalizes the magnitude of the effect of the pose-dependent deformation model $$E_D(D) = \sum_{\text{adjacent faces } i,j} a_{ij} \frac{\|D_i - D_j\|_F^2}{h_{ij}^2} \quad \text{(Equation 4)}$$

$$E_Q(Q) = \sum_{\text{faces } f} a_f \left( \|Q_f^0 - I\|_F^2 + \sum_c \|Q_f^c\|_F^2 \right)$$

Here $h_{ij}$ is the distance between the centroids of template triangles i and j, $a_f$ is the area of triangle f, and $$a_{ij} = \frac{a_i + a_j}{3}$$

is the area of me diamond-shaped region defined by the centroids of triangles i and j and the endpoints of their shared edge.

A weakly informative pose prior, $E_\theta$, is also used, which penalizes deviation from the template pose. This regularizes the pose when the scan provides little useful information.

If D and the function Q were known, a single scan could be reliably aligned by optimizing $E_S(T;S) + E_C(T, \theta; D, Q)$. Since D and Q are not known, co-registration seeks to align all scans in parallel while simultaneously solving for D and Q across scans.

Summing over all scans and adding the model regularization yields the following co-registration optimization problem:

$$\min_{\{T^k\},\{\theta^k\},\{D^P\},Q} \sum_k [ \quad \text{(Equation 5)}$$
$$E_S(T^k;S^k) + \lambda_C(E_C(T^k, \theta^k, D^{Pk}, Q) + \lambda_\theta E_\theta(\theta^k))] +$$
$$\lambda_C \left[ \lambda_D \sum_P E_D(D^P) + \lambda_Q E_Q(Q) \right]$$

Here p indexes people, k indexes scans, and $P_k$ identifies the person in each scan. The $\lambda$'s control the relative influence of terms $\lambda_c$ is particularly important; it controls how much the alignments can deviate from the model.

Optimization:

The objective function is non-linear and the state space of solutions is very high-dimensional. Fortunately its structure admits a tractable alternating optimization scheme. Fixing the shapes $D^P$ and the pose-dependent deformation model $Q(\bullet)$ decouples the scans. Equation 1 (see above) is minimized by solving one non-linear problem of the form $\min_{T^k, \theta^k} E_S(T^k; S^k) + \lambda_C(E_C(T^k, \theta^k; D^{Pk}, Q) + \lambda_\theta E_\theta(\theta^k))$ for each scan.

In essence, these subproblems are standard pairwise registration problems with a strong regularization toward the posable model (i.e. $\min_\theta E_C(\bullet, \theta; D^{Pk}, Q)$). These subproblems are solved, using MATLAB's lsqnonlin (MathWorks, Natick Mass.). Solving 8 such problems takes 3 minutes on an 8-core Opteron processor.

With all $T^k$ and $Q(\bullet)$ fixed, minimization with respect to each person's $D^P$ is an independent linear least squares problem for each person p. Similarly, with all $T^k$ and $D^P$ fixed, minimization with respect to $Q_f(\bullet)$ is an independent linear least squares problem for each triangle f. These sparse least squares problems can be solved efficiently, thus the method's runtime largely depends on its rate of convergence and our ability to compute registration subproblems in parallel.

Co-registration is initialized by fitting an untrained BlendSCAPE model to each scan using $E_s$ and landmark correspondences. This simple model uses a trivial pose-dependent deformation model $Q_f(\theta) = I \forall \theta$. Pose is allowed to vary freely, but shape varies only by isotropically scaling the template. The model fit to scan $S^k$ initializes $T^k$ and $\theta^k$. Each person's shape $D^P$ is initialized by averaging the scale of the fits for their scans. Q is initialized to the identity.

It is useful to perform the optimization in stages. Experiments begin with a low coupling weight $\lambda_C$ so that the crude initial model provides only a rough guide to the registration.

Then, $\lambda_C$ is increased from 0.25 to 1 and 5 over several iterations, tightening the fit of the model to the scans. In each iteration, w.r.t.$T^k$ and θ, then w.r.t.D and Q is minimized. As $\lambda_C$ increases, the estimated model has more influence on the alignments, which enables information from good alignments to inform the registration of noisy scans. In addition, the scale parameter a of the robust error function in $E_s$, is gradually decreased as is frequently done with non-convex error functions; σ, starts at 1 meter and decreases to 5 cm, 1 cm, and 5 mm. It is observed that the result are not very sensitive to the precise sequence of values of these parameters, or to whether intermediate optimization steps are run to convergence.

Experiments:

To demonstrate the accuracy and robustness of co-registration, several body scan corpora are registered. Each corpus consists of multiple individuals in a wide range of poses. By visual appraisal, at least 96% of the scans in each corpus are registered well, and high quality models from both corpora are obtained. No scans were excluded due to registration failure.

Quantitative Analysis:

For quantitative evaluation a dataset of 124 scans of two females in a wide range of standing and sitting poses was used. One of the two women was scanned during two separate sessions two years apart with different clothing and different hair styles. For the purpose of co-registration, the corpus was treated as containing three individuals, each with distinct body shapes. This dataset has extremely challenging poses, scans with significant holes, and hand-placed landmarks that allow evaluation.

Initialization (see optimization, mentioned above) used twelve hand-placed landmarks on each scan. Co-registration was then run as described above with respect to detailed description of co-registration without any landmarks. In eight iterations, good registrations were obtained for all but four scans. Hands were sometimes slightly misaligned, as hand scan data was often quite noisy.

FIG. 7 shows plots of two indicators of registration quality over the course of the co-registration process. Iteration 0 corresponds to initialization. Only six iterations are shown as there was no visible change afterward The "Distance from scan" captures how faithful the alignment is to the scan surface. Statistics of the distance between uniformly sampled points on the scan surface and their nearest points on the aligned template were used. Because an alignment can be close to a scan without having anatomically meaningful correspondence, the "Landmark prediction error" is used to rate correspondence as well. Twenty-four hand-designated landmark vertices (which were not used in registration) are used to predict the location of anatomical landmarks on the scan. These predictions are compared to the locations of these landmarks marked on each scan by a human annotator.

In the first iteration, the alignment surface snaps to within about 1 mm of the scan, but the alignment-scan gap widens afterward. The alignments are pulled toward shapes representable by the model as the alignment-model coupling constant $\lambda_C$ increases between iterations 1 and 3. This results in alignments with better correspondence, as seen by the decrease in landmark prediction error and model to scan error. For evaluation, we withhold 30 scans of the same individuals. The model's ability to fit these held out scans improves with each iteration (see the dashed lines in FIG. 7).

FIG. 8 shows some representative alignments and models according to co-registration by way of example. Sample scans, alignments, and model fits stem from co-registration of 124 scans of three subjects across a range of poses. It is to be noted that many of the scans contain significant amounts of noise and missing data; e.g. the chest and back of the bent-over subject. Co-registration is able to use the data present in a scan and to propagate information learned from other scans.

In order to compare co-registration with existing corpus registration methods, also the corpus of 124 scans was registered, using two algorithms representative of the methods discussed above. In Algorithm I each scan is registered independently using traditional "model-free" registration, and then all registrations are used to learn a model using the same optimization performed in the learning stage of co-registration. Model-free registration is performed using scan-to-mesh distance $E_s$, twelve landmark points, and a nonlinear smoothness regularization from Amberg et al. In Algorithm II, Algorithm I is iterated as in Blanz & Vetter. After each iteration, the resulting model is fit to each scan and used to reinitialize a fresh run of Algorithm I.

All methods yield a registration of the model template and a model fit to each scan. Co-registration alignments give more accurate predictions of the 24 evaluation landmarks, with a mean landmark error of 2.0±2.1 cm versus 3.0±2.8 for Algorithm I and 2.7±2.7 for Algorithm II. Co-registration also yields better models. Models trained using co-registration are better able to fit scans, with a mean scan to model-fit distance of 0.25±0.30 cm on our 30 test scans. Algorithms I and II have distances of 0.38±0.63 and 0.31±0.40 respectively. Co-registration models give a mean landmark prediction error of 2.2±1.8 cm on the 30 test scans, whereas the models generated by I and II have errors of 3.7±9.3 and 3.4±6.0.

Large Scale Registration:

To evaluate the method of this invention on a larger corpus with a wider range of body shapes, a publicly available set of scans provided by Hasler et. al. was registered. The dataset contains 337 scans of 34 different women in 35 poses. Hasler et. al. provide alignments as well, which were used to obtain 36 rough landmark vertices on each scan for initialization. Only six bad registrations have been observed, each to a scan of a different woman. Five are in forward bend poses, in which large portions of the face and chest are missing from the scan. These failures do not appear to impact the model's ability to accurately capture the shapes, D, of the six women.

Improving Existing Registrations:

Because co-registration is able to integrate information from multiple scans of the same person and multiple people in different poses, it can be used to improve extant registered meshes without access to the original scans. 4 female subjects with 10 poses each from the Hasler et. al. dataset have been randomly selected. By fitting the model M to a small number of these registrations, a correspondence between their template and present one has been estimated. This correspondence is used, to initialize $T^k$ for everybody and then use co-registration to learn a model and registration to their registered meshes. Registering registered meshes may seem odd, but it has two effects:

1) it denoises the existing alignments and
2) it learns a model from them.

FIG. 9 refers to registration denoising and shows examples of the original registrations and the refinement. Each pair shows one pose for each of four women. The left mesh is the registration from Hasler et al. these have noise and artifacts. The right mesh is the registration according to present invention to the left registration using co-registration.

Further Embodiments

A preferred embodiment of present invention has been described with respect to solving the corpus registration problem by approaching modeling and alignment simultaneously. The algorithm for 'co-registration' incorporates a BlendSCAPE term into the registration objective function. This allows, to optimize over both aligned template meshes and over a shape model, offering a significant advantage over the traditional three-stage approach to model learning. By providing a well-defined, model-based objective function that a collection of registered meshes should minimize, co-registration allows shape information learned from good data to correct for missing data. To demonstrate the effectiveness of co-registration, several collections of 3D scans have been registered. Co-registration results in high quality alignments and a realistic BlendSCAPE model learned from multiple individuals.

A preferred embodiment of present invention focuses on the SCAPE model, it should be understood that other standard graphics models of the body could be used as well. Furthermore, it is common for graphics models to describe not just 3D shape, but other aspects of an object's visual appearance (e.g. color, reflectance). When working with such models, it is straightforward to extend co-registration to account for more than just shape. In this case, the data term $E_D$ and coupling term $E_C$ simply require additional terms, that estimate the visual agreement between triangles on the scan, alignment, and model. This allows co-registration to compute not only a per shape model, but also, for example, a per-person colored texture map to associate with each shape model.

Above a basic co-registration method has been described, which produces a high quality SCAPE model applicable only to the registered individuals. Of course it should be obvious that not just the shape D of each individual can be learned, but also a low dimensional shape space capable of approximating all body shapes. This has been done previously with SCAPE (see Anguelov et al., 2005 and Balan et al.), but only using traditional registration techniques. Additionally, previous attempts to learn a shape space via PCA focus on single scans of individuals. Since the D estimates are learned across multiple scans of a person, they may be more reliable than those learned from a single scan. It is to be noted also that D in the coupling term $E_C$ can easily be replaced with a low-dimensional projection of D. This helps drive shape estimates toward a low-dimensional space. It also helps co-registration work with datasets in which there are only one or two scans of each individual.

One version of the method works with a corpus of a single individual and produces a personalized avatar for that person. Another version produces an avatar that captures the shape of a corpus of many people.

The method according to this invention can be used to align point clouds or meshes. It can also be used to denoise existing registered methods (model-based mesh denoising). The method's ability to learn realistic models from noisy, hole-filled data also makes it well-suited to noisy depth images, such as those output by the Xbox kinect.

Here it has been described a single Q model for the whole corpus. It is straightforward to make Q depend also on body shape. For example, if we learn a PCA subspace for the body shape, Q can be made a simple function of these shape parameters. For example, Q can be a linear function of the shape parameters and this can be learned simultaneously during co-registration.

The method has been demonstrated for people in tight clothing but it can be applied to people in clothing as well. In this case if we learn a single D, this captures the mean clothing shape. If D is varied with every scan of a person then a low dimensional subspace of clothing shape variation can be captured. This can further be related to body pose. For example, the current Q can be replaced with a global non-rigid body deformation, constructed from this shape deformation subspace, that is related (e.g. linearly) to pose. This would effectively model non-rigid deformations of clothing with pose. The same approach can be used to model muscle deformations.

The invention has been described, using full body scans but it also works with partial scans. For example, devices like the Microsoft Kinect produce one view of a person. As the person moves around other views may be recognized. An entire corpus of partial scans like this can be co-registered. As in the examples of holes, mentioned above, the information from "good" views fills in the information that is missing.

While the focus was set on human bodies, of course this method can be applied to build models of any type of animal or object. Generally, the method and system may be applied for customizing virtual person's clones, like an avatar, according to scan data.

Generally, the example embodiments mentioned above are to be considered in all respects only as illustrative and not restrictive. The scope of the invention is, therefore, indicated by the appended claims rather than by this description.

REFERENCE NUMERALS

T Template
S Object Scan
$S_O$ Another object scan
M Trained object Model
D Object shape deformations
Q Pose-dependent deformation model

What is claimed is:

1. A computer-implemented method comprising:
    under control of a processor implementing specific, computer-executable instructions,
    obtaining first object scan data that corresponds to physical locations on a surface of a first human body, wherein the first human body has a first shape;
    obtaining a trained body model specific to the first human body, wherein obtaining the trained body model comprises:
        accessing a generic body model that includes a template;
        aligning the template to the first object scan data to obtain first aligned object scan data, wherein the template is aligned to the first object scan data based at least in part on the generic body model and a first coupling parameter; and
        training the generic body model with the first aligned object scan data to obtain the trained body model including a first updated template; and
    generating a first visual model of the first human body, wherein generating the first visual model comprises:
        increasing the first coupling parameter to form a second coupling parameter;
        aligning the first updated template to the first object scan data to obtain constrained, aligned object data, wherein the first updated template is aligned to the first object scan data based at least in part on the trained body model specific to the first human body and the second coupling parameter; and updating the trained body model with the constrained, aligned object data to obtain the first visual model of the first human body.

2. The computer-implemented method of claim 1, further comprising:

obtaining second object scan data that corresponds to physical locations on a surface of a second human body, wherein the second human body has a second shape that is different from the first shape; and generating a second visual model of the second human body, wherein generating the second visual model comprises:

aligning the template to the second object scan data to obtain second aligned object scan data;

training the generic body model with the second aligned object scan data to obtain a second version of the trained body model specific to the second human body including a second updated template;

aligning the second updated template to the second object scan data using the second version of the trained body model as a constraint to obtain second constrained, aligned object data; and updating the trained body model with the second constrained, aligned object data to obtain the second visual model of the second human body.

3. The computer-implemented method of claim 1, wherein:

the template comprises a posable model of a human body; the first human body is positioned in a first pose; and updating the trained body model with the constrained, aligned object data to obtain the first visual model of the first human body comprises articulating the template into the first pose.

4. The computer-implemented method of claim 3, wherein the template comprises a three-dimensional ("3D") mesh, the computer-implemented method further comprising computing an internal parameter of the trained object model, wherein the internal parameter transforms the 3D mesh into the body shape and into the pose.

5. The computer-implemented method of claim 3, further comprising:

obtaining second object scan data that corresponds to physical locations on a surface of a second human body, wherein the second human body is positioned in a second pose that is different from the first pose; and generating a second version of the trained body model, specific to the second human body, wherein generating the second version of the trained body model comprises:

aligning the template to the second object scan data to obtain second aligned object scan data;

training the generic body model with the second aligned object scan data to obtain the second version of the trained body model, specific to the second human body and including a second updated template.

6. The computer-implemented method of claim 5, further comprising:

generating a second visual model of the first human body, wherein generating the second visual model comprises:

aligning the second updated template to the second object scan data using the second version of the trained body model, specific to the second human body, as a constraint to obtain second constrained, aligned object data; and updating the second version of the trained body model with the second constrained, aligned object data to obtain the second visual model of the second human body in the second pose.

7. The computer-implemented method of claim 6, wherein the trained body model includes the internal parameter, and wherein updating the trained body model comprises computing the internal parameter to fit the aligned constrained, aligned object data.

8. The computer-implemented method of claim 1, wherein the generic body model includes an internal parameter that determines a body shape and a pose to which the template is transformed, and wherein training the generic body model comprises computing the internal parameter to fit the aligned object scan data.

9. The computer-implemented method of claim 8, wherein computing the internal parameter comprises using an error function that samples a location on a surface of the template and a corresponding location on a surface of the object scan data to approximate error in the aligned object scan data.

10. The computer-implemented method of claim 1, wherein the template comprises an articulated model of a human body, wherein a first body part of the articulated model can be moved independently of a second body part of the articulated model.

11. A system comprising:

a data repository storing at least:

object scan data representing physical locations on a surface of a body of an object; and a body model that includes a template mesh and a parameter that transforms a surface shape of the template mesh; and a processor in communication with the data repository, the processor programmed by specific computer-executable instructions to at least:

obtain an updated parameter specific for the object for transforming the template mesh, wherein to obtain the updated parameter, the processor is further programmed by specific computer-executable instructions to at least:

align the template mesh to the object scan data to obtain a first registration between the template mesh and the object scan data, wherein the template mesh is aligned to the first object scan data based at least in part on the generic body model and a first coupling parameter; and train the body model with the first registration to obtain the updated parameter for transforming the template mesh; and generate a visual model of the object, wherein to generate the visual model, the processor is further programmed by specific computer-executable instructions to at least:

align the object scan data to the template mesh using the updated parameter specific for the object as a constraint to obtain a second registration between the template mesh and the object scan data, wherein using the updated parameter specific for the object as a constraint is based at least in part on a second coupling parameter, further wherein the second coupling parameter is greater than the first coupling parameter, refine the body model with the second registration to obtain a refined parameter that transforms the template mesh such that the surface shape of the template mesh corresponds to at least some of the physical locations represented by the object scan data, and generate the visual model by applying the refined parameter to the template mesh.

12. The system of claim 11, wherein aligning the object scan data to the template mesh with the updated parameter transforms the template mesh into an approximation of the object.

13. The system of claim 11, wherein the template comprises a model of a human body, wherein the object comprises a first person having a first body shape, and wherein the refined parameter transforms the surface shape of the template mesh into the first body shape.

14. The system of claim 13, wherein the processor is further programmed by specific computer-executable instructions to at least:

obtain additional object scan data that corresponds to physical locations on a surface of an additional object, wherein the additional object comprises a second person having a second body shape; and generate a visual model of the second person, wherein to generate the visual model of the second person, the processor is further programmed by specific computer-executable instructions to at least:

align the template mesh to the additional object scan data to obtain a third registration between the template mesh and the additional object scan data;

train the body model with the third registration to obtain the trained body model having an additional updated parameter for transforming the template mesh;

align the additional object scan data to the template mesh using the additional updated parameter as a constraint to obtain a fourth registration between the template mesh and the additional object scan data;

refine the body model with the fourth registration to obtain the refined parameter, wherein the refined parameter is capable of transforming the template mesh such that the surface shape of the template mesh corresponds to at least some of the physical locations represented by either of the object scan data and the additional object scan data; and generate the visual model of the second person by applying the refined parameter to the template mesh.

15. The system of claim 11, wherein the template mesh comprises a posable model of a human body, wherein the object comprises a person positioned in a pose, and wherein the refined parameter articulates the surface shape of the template mesh into the pose.

16. The system of claim 11, wherein to align the template mesh to the object scan data, the processor is further programmed by specific computer-executable instructions to at least deform the surface shape of the template mesh to align with a surface represented by the object scan data by inferring a shape of the body of the object from noisy data.

17. The system of claim 11, wherein the processor is further programmed by specific computer-executable instructions to at least use an error function for training and refining the body model, wherein the error function samples a location on a surface of the template mesh and a corresponding location on a surface of the object scan data to approximate error in the aligned object scan data.

18. The system of claim 11, wherein the processor is further programmed by specific computer-executable instructions to at least:

use a first scale parameter for the error function for training the body model with the first registration; and use a second scale parameter for the error function for refining the body model with the second registration, wherein the first scale parameter is greater than the second scale parameter.

* * * * *